United States Patent Office 2,782,319
Patented Feb. 19, 1957

2,782,319

RADIATION DETECTION

Kenneth B. McAlpine and Dale W. Rinehart, Brackenridge, Pa., assignors to Pittsburgh Plate Glass Company No Drawing. Application November 14, 1951,
Serial No. 256,384

5 Claims. (Cl. 250—83)

This invention relates to the detection of short wave radiation such as gamma rays or X-rays. More particularly, it relates to glass that is sensitive to such radiation and which provides, by a change in transparency or color, at least a rough quantitative indication of the total radiation to which the glass has been exposed.

The detection of gamma and other radiation is a matter of steadily increasing importance and it is now essential that many workmen be safeguarded from excessive radiation. Thus, it is important to provide a reliable check that will show when a workman has been exposed to an excessive amount of radiation.

Various radiation-sensitive devices have been proposed or used for this purpose. For example, certain types of photographic film may be worn upon the person and shielded from harmless radiation to which the film is sensitive. After a suitable period of time, the film is developed to determine the extent of the radiation to which it has been exposed.

Devices of this type have several obvious disadvantages. For example, the film cannot be re-used after development, so that considerable expense is involved in continually protecting the workmen. In addition, film-developing facilities must be maintained, and where a relatively large number of persons are to be safeguarded, an extensive and carefully maintained record system is required.

Some direct-reading radiation detection devices have been proposed, but they have been expensive and therefore not economical for large scale use.

In accordance with one aspect of the present invention, a simple direct-reading radiation dosimeter is provided that is so inexpensive that it can be used readily by large masses of the population as well as workers in occupations where they may be exposed accidentally to harmful short-wave radiation.

We have found that a direct reading dosimeter of the character described may advantageously be formed of glass of the general alkali-alkaline earth-silica type wherein the alkaline earth is barium oxide or strontium oxide and the alkali is sodium oxide, potassium oxide or both. We have further found that certain metal oxides are deleterious in such radiation dosimeter glass compositions, in some instances, as more particularly described hereinafter, fractional percentages of iron oxide or cerium oxide added to glass compositions which were highly sensitive to short-wave irradiation resulted in a glass product which showed practically no color change after exposure to X-rays.

In the various glass compositions which were found to exhibit visible color change upon irradiation, the usual color imparted by the irradiation was a deep purple. However, it is to be noted that this color in many instances fades away to an extent governed not only by the type of glass but also by the temperature and illumination to which it is exposed after irradiation.

In the change of color of the various glass compositions tested, the practice was to view a ¼"×¼"×4" glass strip at one end so that the full 4" of depth could be noted. In making quantitative measurements of the decrease in light transmission due to irradiation, eight samples each ⅛" thick of a given glass were assembled in a stack or sandwich and the initial transmission of the assembly was measured by the use of a spectrophotometer. After irradiating these samples they were reassembled as before and the light transmission again measured; the transmission change measured approaches that shown by a one inch long rod of glass irradiated from the side and observed along the axis. With more sensitive glass compositions it was feasible to measure the diminution in light transmission directly without resorting to the stacking of thin samples.

Two glass compositions which were found to be particularly responsive to short-wave radiation are composed as follows:

Glass A—39.1% $SiO_2$, 15.5% $K_2O$, 45.4% BaO
Glass B—49.1% $SiO_2$, 15.5% $K_2O$, 35.4% SrO (Compositions of the glasses set forth herein are in terms of percentage by weight of the glass.)

In one test, glass A, in a sample ⅛" thick, was exposed to an X-ray dosage of 1,000 roentgens (at 100 kilovolts). This glass had an initial solar luminous transmission of 92%; after the X-ray exposure the luminous transmission was decreased 9%. Exposure to X-ray dosages of 1,000 roentgens (at 200 kilovolts), 2,000 roentgens (at 100 kilovolts), and 76,000 roentgens (at 100 kilovolts) decreased the luminous transmission respectively 13.3%, 16.6% and 76.3%. All measurements of transmission changes referred to in this specification were made some two to three hours after exposure of the sample to irradiation. Consequently some color fading had occurred before measurement, and those compositions which exhibited high darkening which was largely transient are reported in terms of the persistence of more permanent color changes.

On exposing a sample ¼"×¼"×4" of glass A to an X-ray dosage of only 50 roentgens, it was observed that this glass had darkened considerably to a deep blue, as viewed through the four inch length; this glass is visibly color-sensitive to X-ray dosages much less than 50 roentgens. While the color slowly fades in this glass, two months after exposure to 50 roentgens, the color was distinctly visible.

Glass B when tested for solar light transmission after exposure to 1,000 roentgens (at 100 kilovolts) also showed a decrease in transmission of 9% from its initial transmission of 89.3%.

In general, it was found that, at moderate X-ray dosages, such as about 1,000 roentgens, increasing percenatges of barium oxide at the expense of the percentage of $SiO_2$ resulted in greater darkening of the glass, though the effect of the barium oxide content is less pronounced at the upper practical limit of substantially 45%. For example, a glass composition containing 79.13% $SiO_2$, 15.45% $Na_2O$ and only 5.42% BaO decreased in light transmission only 2.2% after 1,000 roentgens whereas when the barium oxide content was increased to 25.42% (with a corresponding reduction in the percentage of silica) the light transmission after similar exposure decreased 6.2% from the initial unirradiated transmission values of 91.9% and 90.8% respectively. Otherwise stated, the increase in barium oxide content nearly tripled the darkening of the glass upon irradiation.

Increasing percentages of strontium oxide especially at the lower ranges likewise result in greater darkening of a glass upon irradiation, as shown by the following tabulation:

Table I

| Glass | Percent $SiO_2$ | Percent $Na_2O$ | Percent SrO | Percent Initial Transmission | Percent Decrease on Irradiation (1,000 r.) |
|---|---|---|---|---|---|
| C | 74.13 | 15.45 | 10.42 | 85.0 | 2.3 |
| D | 69.13 | 15.45 | 15.42 | 91.6 | 4.6 |
| E | 59.13 | 15.45 | 25.42 | 90.7 | 6.1 |
| F | 49.13 | 15.45 | 35.42 | 90.9 | 6.0 |
| B | 49.13 | 15.45 ($K_2O$) | 35.42 | 89.3 | 9.0 |

The preferred range of strontium or barium oxide (or mixture of the two) is between 5 and 45%. In most formulations, when the alkali constituent of a given glass is $K_2O$ rather than $Na_2O$ greater darkening occurs upon exposure to a given dosage of radiation. In Table II is shown the comparison in light transmission after irradiation with 1,000 roentgens for various contents of silica, alkali and barium oxide.

Table II

| Glass | Percent $SiO_2$ | Percent Alkali | Percent BaO | Percent Initial Transmission | Percent Decrease in Transmission |
|---|---|---|---|---|---|
| G | 69.13 | 15.45 ($Na_2O$) | 15.42 | 90.9 | 4.9 |
| H | 69.13 | 15.45 ($K_2O$) | 15.42 | 91.5 | 6.7 |
| J | 39.13 | 15.45 ($Na_2O$) | 45.42 | 90.5 | 7.5 |
| A | 39.13 | 15.45 ($K_2O$) | 45.42 | 92.0 | 9.0 |

In glass compositions containing about 22% barium or strontium oxide, the remainder being $SiO_2$ and sodium or potassium oxide, an optimum sensitivity was achieved with about 21% alkaline oxide and 57% $SiO_2$. A glass consisting of 57.5% $SiO_2$; 20.5% $Na_2O$; and 22.0% BaO was found to be colored distinctly by exposure to a radiation dosage of 50 roentgens.

The substitution of zinc oxide for strontium oxide in formulations such as glasses D and E (Table I) resulted in considerably less darkening, the effect being of the order of only one third of the effect with strontium oxide. Similarly, the substitution of calcium oxide for strontium oxide in such glass formulations resulted in a diminution of the darkening effect; the darkening yielded by a given percentage of calcium oxide was approximately the same as that resulting with an equivalent percentage of zinc oxide.

It was observed that in a high barium oxide, low silica glass (e. g. 45.42% BaO and 39.13% $SiO_2$), the replacement of the $Na_2O$ component with $Rb_2O$ increased the darkening upon treatment with 1,000 roentgen so that the light transmission decreased from 7.5% to 8.3%.

Small percentages of phosphorous pentoxide ($P_2O_5$) in a radiation sensitive barium oxide composition tended to lower the decrease in light transmission on treatment, but made the coloration of the glass more reddish and thus more conspicuous. To this extent the addition of one or two percent of $P_2O_5$ may be beneficial in certain applications.

Vanadium pentoxide, bismuth trioxide and arsenic oxide ($As_2O_3$) are somewhat deleterious to the radiation darkening of glasses according to the present invention, but can be tolerated in very small percentages, which are less than 3% in the case of arsenic, less than 2% in the case of bismuth and less than 1% in the case of vanadium.

As indicated heretofore, iron oxide and cerium oxide are destructive of radiation sensitivity in the above formulations even in fractional percentages. Titanium oxide and antimony oxide are also deleterious and to be avoided as impurities when seeking a radiation sensitive glass. The influence of cerium and titanium oxides is shown in Table III.

Table III

| Glass | Percent $SiO_2$ | Percent $K_2O$ | Percent BaO | Percent Impurity | Percent Initial Light Transmission | Percent Light (1,000 r.) | Decrease (76,000 r.) |
|---|---|---|---|---|---|---|---|
| A | 39.13 | 15.45 | 45.42 | | 92 | 9.0 | 76.3 |
| K | 38.63 | 15.45 | 45.42 | 0.50 $As_2O_3$ | 91.1 | 8.2 | 81.3 |
| L | 38.13 | 15.45 | 45.42 | 0.50 $As_2O_3$; 0.50 $CeO_2$ | 91.3 | 0.0 | 2.2 |
| M | 37.93 | 15.45 | 45.42 | 0.50 $As_2O_3$; 0.50 $CeO_2$; 0.20 $TiO_2$ | 90.4 | 0.0 | 2.6 |

It was noted that heavy dosages of radiation to the extent of about 76,000 roentgens decreased the light transmission of the more radiation sensitive glass compositions about 80%. This is in contrast to the effect of a similar radiation dosage on ordinary iron-free soda-lime-silica glass which has a residual transmission about four-fold that of the more sensitive glasses.

An additional factor in radiation dosimetry is the effect of the voltage of the radiation source, increased voltage producing a greater cumulative darkening effect on glass compositions made in accordance with this invention.

In contrast to the relatively persistent coloration caused by moderate irradiation of the silica-alkali-alkaline earth compositions, it was observed that a composition containing 96% $SiO_2$; 0.5% $Na_2O$; and 3.5% $B_2O_3$ produced a particularly fugitive or transient coloration when irradiated. While the latter composition showed easily visible coloration on a $4'' \times \frac{1}{4}'' \times \frac{1}{4}''$ strip with an exposure of only 50 roentgens, within about one-half hour the color had substantially disappeared. A treatment of at least 200 roentgens on this composition was necessary in order to ensure that the coloration would be visible one day after exposure. Glass having such temporary color retaining characteristics is useful primarily in laboratory work and as an immediate rough index of total radiation.

In making radiation sensitive glass compositions according to this invention, it is important to avoid the impurities which change the character of the glass as pointed out previously. It is recommended that crucibles made of platinum or similar inert materials be used for the melt. Impurities may leach out of ceramic materials into the melt and decrease the color sensitivity of the glass.

The presence of more than 35% strontium oxide in glasses made according to this invention is not desirable because of the difficulty of working with such brittle glass. Barium oxide in excess of 45% is not recommended because of the undesirable physical characteristics of the glass and because the darkening is not usually increased to any significant extent by additional amounts of barium.

From the foregoing it will be observed that the glass compositions embodying the invention are well adapted for the attainment of the ends and objects hereinbefore set forth and to be economically manufactured, the formulations being subject to such modifications as may be desirable in adapting the invention to each particular use.

What is claimed is:

1. The method of visibly detecting cumulative exposure to short-wave radiation which comprises placing a piece of a glass composition at a position where short-wave radiation may strike the composition and observing at intervals the extent of darkening of the composition, said composition consisting by weight of about 40% to 80% $SiO_2$, about 10% to 23% of an alkali oxide selected from the group consisting of sodium oxide, potassium oxide, rubidium oxide as well as mixtures thereof, and about 5% to 45% of an alkaline earth oxide selected from the class consisting of barium oxide, strontium oxide and combinations thereof.

2. The method according to claim 1 wherein said glass composition also contains a small amount of phosphorous pentoxide in an amount not exceeding 2% of the glass composition.

3. The method according to claim 1 wherein said glass composition consists by weight essentially of 57.5% $SiO_2$; 20.5% $Na_2O$ and 22% BaO, the composition being substantially free of oxides of iron cerium, titanium and antimony.

4. The method according to claim 1 wherein said glass composition consists by weight essentially of 39% $SiO_2$; 15.5% $K_2O$; and 45.5% BaO, the composition being substantially free of oxides of iron, cerium, titanium and antimony.

5. The method according to claim 1 wherein said glass composition consists by weight essentially of 49% $SiO_2$; 15.5% $K_2O$; and 35.5% SrO, the composition being substantially free of oxides of iron, cerium, titanium and antimony.

References Cited in the file of this patent

UNITED STATES PATENTS

| | | |
|---|---|---|
| 703,512 | Zsigmondy | July 1, 1902 |
| 1,169,571 | Rosenthal | Jan. 25, 1916 |
| 2,212,879 | Kalsing et al. | Aug. 27, 1940 |
| 2,414,504 | Armistead | Jan. 21, 1947 |
| 2,469,490 | Armistead | May 10, 1949 |
| 2,477,329 | De Gier et al. | July 26, 1949 |
| 2,559,805 | Stookey | July 10, 1951 |

FOREIGN PATENTS

| | | |
|---|---|---|
| 124,318 | Australia | 1947 |
| 17,666 | Great Britain | 1903 |
| 443,582 | Germany | 1927 |

OTHER REFERENCES

"X-Rays in Practice," by Sproul; first edition, page 292.

Glastechnische Tabellen, Eitel, Pirani, Scheel. (1932), page 654.

Morey: Properties of Glass (1938), pages 301, 378, 380, 381, 560, and 561.